(12) United States Patent
Franco

(10) Patent No.: US 7,908,022 B2
(45) Date of Patent: Mar. 15, 2011

(54) SYSTEM AND METHOD FOR REDUCING TOXIC WASTE IN MANUFACTURING PROCESSES

(75) Inventor: Lucas G. Franco, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/235,997

(22) Filed: Sep. 23, 2008

(65) Prior Publication Data

US 2009/0132079 A1 May 21, 2009

(30) Foreign Application Priority Data

Sep. 28, 2007 (CA) .................................... 2604727

(51) Int. Cl.
*G06F 19/00* (2006.01)
*G06F 17/00* (2006.01)
*G05B 13/02* (2006.01)

(52) U.S. Cl. ................. 700/99; 700/36; 705/400; 703/2

(58) Field of Classification Search .................... 700/28, 700/29, 31, 36, 99–104, 121, 173, 266, 271, 700/274; 705/7–9, 11, 308, 400, 500; 715/771–772, 965; 703/2, 6

See application file for complete search history.

(56) References Cited

U.S. PATENT DOCUMENTS

| | | | | |
|---|---|---|---|---|
| 5,561,790 A * | 10/1996 | Fusaro | ............................. | 703/26 |
| 5,893,081 A * | 4/1999 | Poppen | ......................... | 705/400 |
| 6,564,154 B1 * | 5/2003 | Zimmerman et al. | ........... | 702/24 |
| 6,996,065 B2 * | 2/2006 | Kodialam et al. | .............. | 370/238 |
| 7,715,936 B2 * | 5/2010 | Thierauf | .......................... | 700/99 |
| 2009/0063211 A1 * | 3/2009 | Campo et al. | ..................... | 705/7 |

* cited by examiner

*Primary Examiner* — Sean P Shechtman
(74) *Attorney, Agent, or Firm* — Douglas A. Lashmit; Hoffman Warnick LLC

(57) ABSTRACT

A system and method of optimizing a manufacturing process so as to reduce toxic waste in the process. In an embodiment, the method includes: describing the manufacturing process using a plurality of nodes, each node representing a component or a process; connecting the plurality of nodes with directed edges to form a directed graph, the directed graph representing possible manufacturing process flows from a begin node to an end node; assigning to each edge a value representative of a cost resulting from toxic waste generated by a component or process; and determining a shortest path from the begin node to the end node in the directed graph to identify manufacturing process flow having a minimum cost.

18 Claims, 6 Drawing Sheets

```
INF = 1e5
costs = [[0.0, 3.0, 5.0, INF, INF, INF, INF, INF, INF, INF],
         [INF, 0.0, INF, 2.0, 1.0, 1.0, INF, INF, INF, INF],
         [INF, INF, 0.0, INF, 2.0, 3.0, INF, INF, INF, INF],
         [INF, INF, INF, 0.0, 2.0, INF, 6.0, INF, INF, INF],
         [INF, INF, INF, INF, 0.0, INF, INF, 2.0, INF, INF],
         [INF, INF, INF, INF, INF, 0.0, INF, 4.0, 1.0, 2.0],
         [INF, INF, INF, INF, INF, INF, 0.0, 1.0, INF, 2.0],
         [INF, INF, INF, INF, INF, INF, INF, 0.0, INF, 1.0],
         [INF, INF, INF, INF, INF, INF, INF, INF, 0.0, 5.0],
         [INF, INF, INF, INF, INF, INF, INF, INF, INF, 0.0]]
```

FIG. 3  ← 300

```
# modified shortest path
# d = cost matrix (i, j)
# V = array of nodes
# j = destination node
def mod_shortest_path(d, V, j):

# init
    T = [j]
    U = list_copy(V)
    U.remove(j)
    v = []
    s = []

for k in range(0, len(U)):
        v.append(INF)
        s.append(-1)

v.insert(j, 0)
    s.insert(j, j)

# find shortest path
        try:
            while U != []:
                for k in U:
                    # update partial costs and the
                    # node's sucessors
                        if v[j] + d[k][j] < v[k]:
                            v[k] = v[j] + d[k][j]
                            s[k] = j
                # update effective cost
                tmp = (INF * ones(len(V))).tolist()
                for k in U:
                    tmp[k] = v[k]
                j = argmin(tmp)
                T.append(j)
                U.remove(j)
            return s
        except:
            return "Invalid input data"
```

FIG. 4 — 400

SYSTEM AND METHOD FOR REDUCING TOXIC WASTE IN MANUFACTURING PROCESSES

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates to systems and methods for reducing toxic waste in manufacturing processes.

RELATED ART

Today, people are becoming more aware of the need to reduce the environmental impact of manufacturing processes in order to improve people's health and to ensure long-term sustainability of the environment. One way to achieve this is to reduce toxic waste that may be produced during manufacturing processes. However, some manufacturing processes may involve hundreds or thousands of components, and as many or more processing steps to complete, making the task of decreasing toxic waste difficult.

SUMMARY OF THE INVENTION

The present invention relates to a system and method for decreasing toxic waste in manufacturing processes.

In an aspect of the invention, there is provided a method of optimizing a manufacturing process to reduce toxic waste in the manufacturing process, comprising: describing the manufacturing process using a plurality of nodes, each node representing a component or a process; connecting the plurality of nodes with directed edges to form a directed graph, the directed graph representing possible manufacturing process flows from a begin node to an end node; assigning to each edge a value representative of a cost resulting from toxic waste generated by a component or process; and determining a shortest path from the begin node to the end node in the directed graph to identify a manufacturing process flow having a minimum cost.

In an embodiment, the method further comprises: building a cost matrix representing an array of the plurality of nodes, with values in the cost matrix representing the edge values between nodes; and executing a modified Dijkstra's shortest path algorithm on the cost matrix, wherein the algorithm is run from the end node instead of the begin node, to determine the shortest path from the begin node to the end node in the directed graph.

In another embodiment, the method further comprises identifying the nodes in the shortest path, and presenting an ordered combination of any components or processes in the shortest path as a solution for minimizing toxic waste in the manufacturing process.

In another embodiment, the method further comprises modifying the directed graph to incorporate new information by adding or deleting nodes or edges, and by adding or modifying edge values.

In another embodiment, the method further comprises providing a graphical user interface to allow a user to modify the directed graph by adding or deleting node objects or edge objects, and by adding or modifying edge values associated with the edge objects.

In another embodiment, the method further comprises converting the directed graph in the graphical user interface into a new cost matrix.

In another embodiment, the method further comprises re-executing the modified Dijkstra's shortest path algorithm on the new cost matrix to identify the shortest path from the begin node to the end node.

In another aspect, there is provided a system for optimizing a manufacturing process to reduce toxic waste in the manufacturing process, comprising: means for describing the manufacturing process using a plurality of nodes, each node representing a component or a process; means for connecting the plurality of nodes with directed edges to form a directed graph, the directed graph representing possible manufacturing process flows from a begin node to an end node; means for assigning to each edge a value representative of a cost resulting from toxic waste generated by a component or process; and means for determining a shortest path from the begin node to the end node in the directed graph to identify a manufacturing process flow having a minimum cost.

In an embodiment, the system further comprises: means for building a cost matrix representing an array of the plurality of nodes, with values in the cost matrix representing the edge values between nodes; and means for executing a modified Dijkstra's shortest path algorithm on the cost matrix, wherein the algorithm is run from the end node instead of the begin node.

In another embodiment, the system further comprises means for identifying the nodes in the shortest path, and presenting an ordered combination of any components or processes in the shortest path as a solution for minimizing toxic waste in the manufacturing process.

In another embodiment, the system further comprises means for modifying the directed graph to incorporate new information by adding or deleting nodes or edges, and by adding or modifying edge values.

In another embodiment, the system further comprises means for providing a graphical user interface to allow a user to modify the directed graph by adding or deleting node objects or edge objects, and by adding or modifying edge values associated with the edge objects.

In another embodiment, the system further comprises means for converting the directed graph in the graphical user interface into a new cost matrix.

In another embodiment, the system further comprises means for re-executing the modified Dijkstra's shortest path algorithm on the new cost matrix to identify the shortest path from the begin node to the end node.

In another aspect, there is provided a data processor readable medium storing data processor code that when loaded onto and executed by a data processing device adapts the device to execute a method of optimizing a manufacturing process reduce toxic waste in the manufacturing process, the data processor readable medium comprising: code for describing the manufacturing process using a plurality of nodes, each node representing a component or a process; code for connecting the plurality of nodes with directed edges to form a directed graph, the directed graph representing possible manufacturing process flows from a begin node to an end node; code for assigning to each edge a value representative of a cost resulting from toxic waste generated by a component or process; and code for determining a shortest path from the begin node to the end node in the directed graph to identify a manufacturing process flow having a minimum cost.

In an embodiment, the data processor readable medium further comprises: code for building a cost matrix representing an array of the plurality of nodes, with values in the cost matrix representing the edge values between nodes; and code for executing a modified Dijkstra's shortest path algorithm on the cost matrix, wherein the algorithm is run from the end node instead of the begin node.

In another embodiment, the data processor readable medium further comprises: code for identifying the nodes in the shortest path, and presenting an ordered combination of any components or processes in the shortest path as the solution for minimizing toxic waste in the manufacturing process.

In another embodiment, the data processor readable medium further comprises: code for modifying the directed graph to incorporate new information by adding or deleting nodes or edges, and by adding or modifying edge values.

In another embodiment, the data processor readable medium further comprises: code for providing a graphical user interface to allow a user to modify the directed graph by adding or deleting node objects or edge objects, and by adding or modifying edge values associated with the edge objects.

In another embodiment, the data processor readable medium further comprises: code for converting the directed graph in the graphical user interface into a new cost matrix.

In another embodiment, the data processor readable medium further comprises: code for re-executing the modified Dijkstra's shortest path algorithm on the new cost matrix to identify the shortest path from the begin node to the end node.

These and other aspects of the invention will become apparent from the following more particular descriptions of exemplary embodiments.

BRIEF DESCRIPTION OF THE DRAWINGS

The figures illustrate exemplary embodiments of the invention.

FIG. 3 shows an illustrative cost matrix corresponding to the graph shown in FIG. 2.

FIG. 4 shows illustrative pseudo-code for finding an optimal path in the graph of FIG. 2.

DETAILED DESCRIPTION OF THE INVENTION

As noted above, the present invention relates to a system and method for decreasing toxic waste in manufacturing processes.

Figure 1:
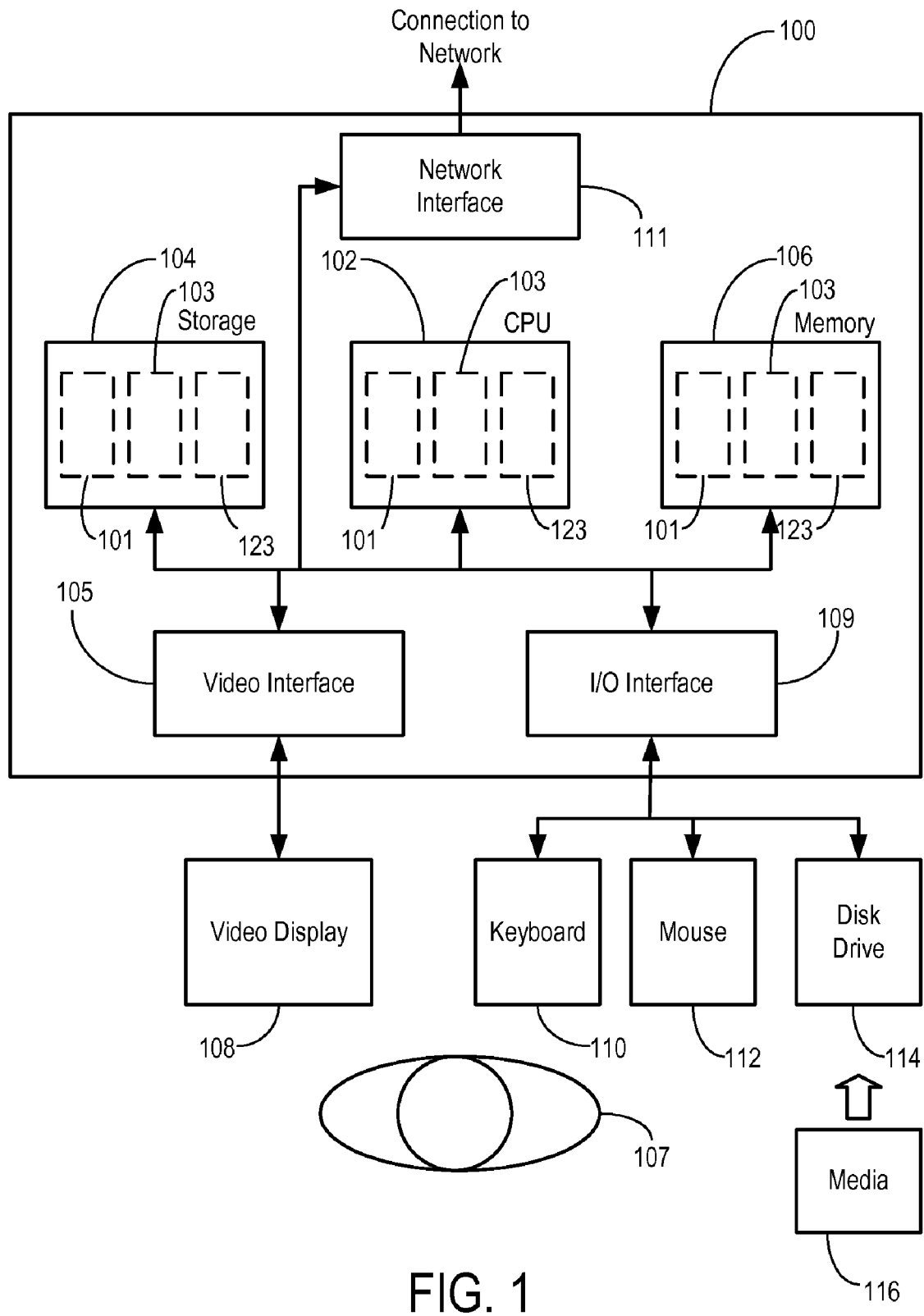
FIG. 1 shows a generic data processing system that may provide a suitable operating environment.

The invention may be practiced in various embodiments. A suitably configured data processing system, and associated communications networks, devices, software and firmware may provide a platform for enabling one or more of these systems and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Figure 2:
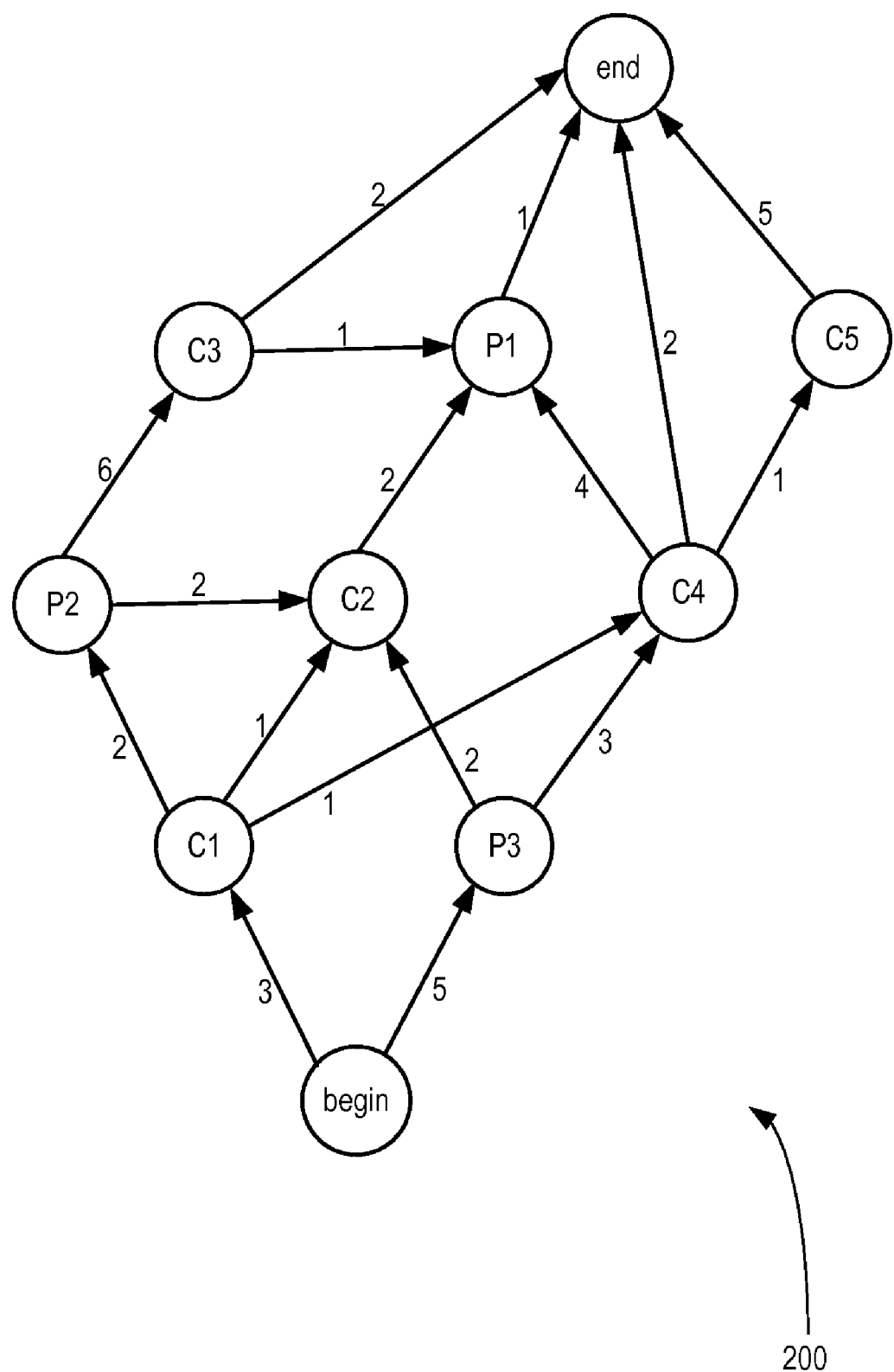
FIG. 2 shows a schematic graph illustrating a manufacturing process in accordance with an embodiment.

Now referring to FIG. 2, shown is a schematic graph 200 illustrating a system in accordance with an embodiment. The nodes of graph 200 represent various components C1, C2, C3, C4, C5 and various processes P1, P2, P3 that may be used during a product manufacturing process. Directed edges (shown in FIG. 2 as arrows) may connect the components and nodes, providing various paths that may be taken between a "begin" node and an "end" node. These various paths may represent alternative components and processes that may be used in order to manufacture a product. In an embodiment, each edge of the graph may have assigned to it a value indicative of a "cost" associated with each component or process.

The "cost" value assigned to each edge may be derived for example from empirical data collected in various studies or experiments based on knowledge of the level of toxicity of each component or process. As an illustrative example, in electronics manufacturing, various substances, chemicals, and processes may be employed during electronics manufacturing that may produce toxic waste. One example of a process that may produce toxic waste is cleaning of a circuit board using organic solvents prior to and/or after surface mounting components using a tin-based alloy solder. This may result in liquid effluents containing the organic solvents and waste particles including heavy metals and arsenic. The amount of liquid effluent or particulate waste produced and not treated or otherwise reclaimed prior to release to the environment may be used to assign a relative environmental "cost".

An analysis may also be performed on a component, such as a circuit board component, and a value may be assigned for the amount of toxic substance that may be used in the component, or used during attachment of the component to the circuit board. A relative environmental "cost" may then be assigned to the component based on empirical data.

In an alternative manufacturing process, the use of a different surface mounting technique, or the use of different soldering materials to attach the components may result in reduced waste particles, or even the avoidance of a cleaning step using organic solvents. In this case, a lower environmental "cost" value may be assigned to an edge in this alternative manufacturing process path. While preparing a schematic graph representation of various manufacturing process alternatives may take some effort, once the graph is created, the process of finding a possible solution for an optimized manufacturing process may then be greatly simplified.

After preparing a graph representation of various manufacturing process alternatives as described above, a modified Dijkstra's shortest path algorithm may be used in order to obtain the shortest path in the graph. In an embodiment, Dijkstra's shortest path algorithm may be modified to run from the "end" node instead of the "begin" node (illustrated in FIG. 2). Assuming that the relative environmental "cost" values have been assigned correctly, the resulting shortest path then represents a manufacturing process involving the selection of components and processes that may minimize the total amount of toxic waste generated. A more detailed description will now be provided.

For a given product or substance, a first step is to represent in a graph format known processes and components (or ingredients) for completing a manufacturing process. In the graph, each component and process is represented as a node, and directed edges connect some of the nodes. This is illustrated in graph 200 of FIG. 2, as discussed above. In graph 200, each possible path between the "begin" node and "end" node represents a possible manufacturing process that may form a product manufacturing cycle. All edges in the graph 200 have a value assigned, representing the amount of toxic waste generated by using a particular component or a particular processing step. A negative value may also be assigned to an edge in the graph, for example, if a processing step is specifically used for removing toxic waste particles from a liquid effluent before the effluent is released to the environment.

Now referring to FIG. 3, a "cost" matrix 300 may be developed for graph 200 of FIG. 2, with the "cost" being the value representing the relative environmental cost of the toxic waste generated. For the present example, cost matrix 300 shown in FIG. 3 includes values corresponding to the edge values between nodes. In this example, "INF" indicates that there is no edge or path provided between two given nodes. As the cost matrix 300 is strictly upper triangular, a sparse representation or other simplified form may be used.

Now referring to FIG. 4, an illustrative example of pseudo-code 400 for finding a shortest path in graph 200 is shown. As noted earlier, this modified Dijkstra's shortest path algorithm calculated using pseudo-code 400 runs from the "end" node, and leads to the shortest path in the graph from the "begin" node to the "end" node. The solution is found right after running pseudo-code 400.

Figure 5:
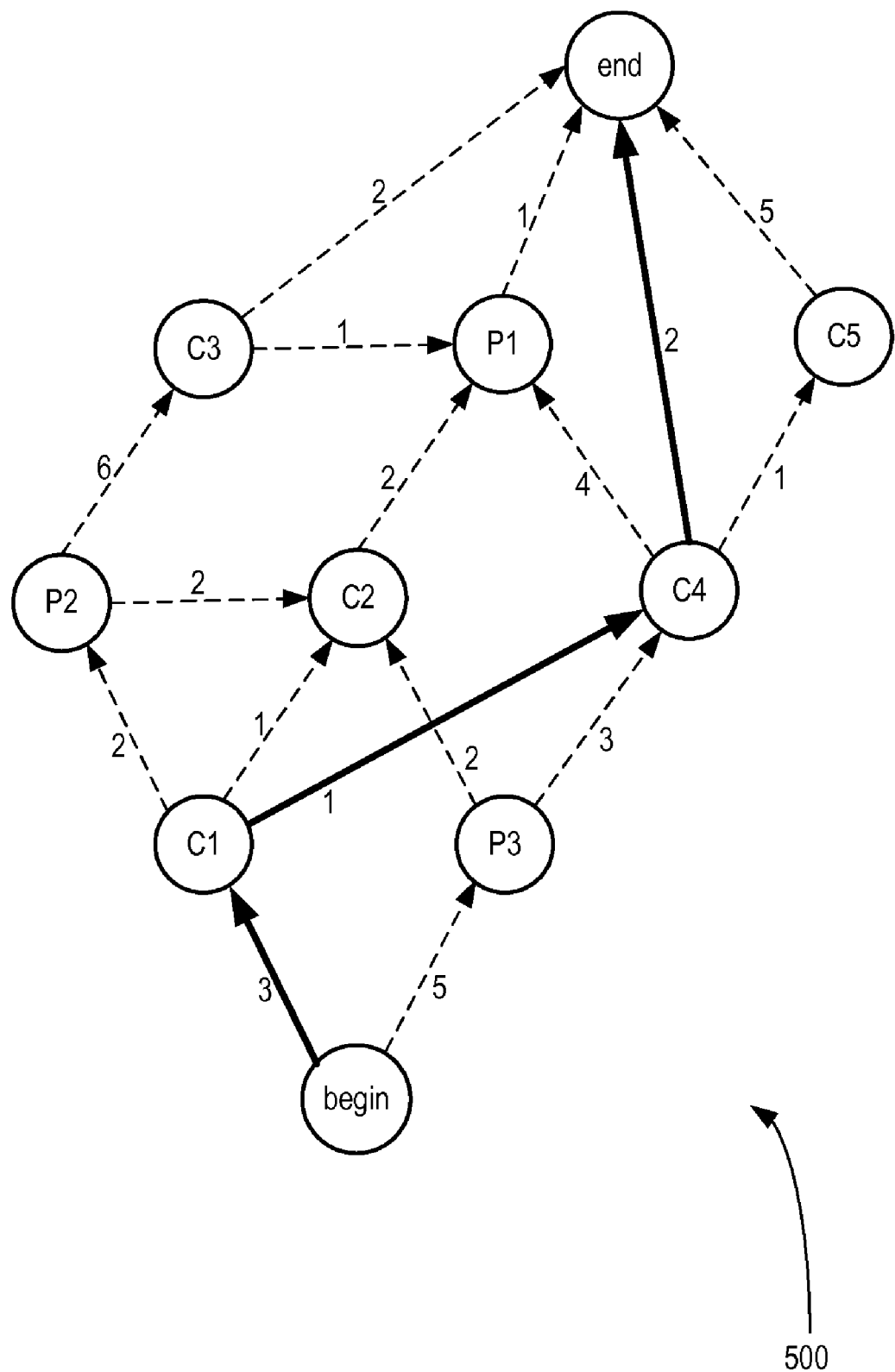
FIG. 5 shows a schematic graph illustrating a resulting shortest path solution obtained by executing the pseudo-code of FIG. 4.

In the present illustrative example, pseudo-code 400 results in a solution in which the shortest path includes C1 and C4, as illustrated in FIG. 5. The optimal path may be highlighted as shown in FIG. 5, and in this illustrative example indicates that a product should be manufactured using components C1 and C4 in order to minimize the toxic waste generated. While this is a very simple illustrative example involving relatively few components and processes, it will be appreciated that this approach to minimizing toxic waste generation may be extended to any number of components and processes, connected by any number of edges with assigned edge values.

In an embodiment, the invention could be implemented on the data processing system 100 of FIG. 1, with a database stored in storage 104 and populated with the manufacturing components and processes, the edges linking the components and processes, and the corresponding "costs". The user may then add to or modify entries in the database to model the graph based on the best available information.

While an optimal solution may by calculated for a given graph model as described above, it will be appreciated that if new and better information is obtained for the relative value of an environmental "cost", or if new or improved components and/or processes are developed, the graph may be updated to include the new cost values and the new components and processes to potentially arrive at a new optimal solution that may be an improvement over the original solution. Therefore, the system as described above may be used iteratively to continually improve a manufacturing process in order to minimize toxic waste.

In an embodiment, a suitable graphical user interface (GUI) may be provided such that the user may easily add, delete, or modify components, processes, edges and edge values in a graph using an intuitive graphical user interface. This may aid the user in modifying the graph with any new data, and running subsequent iterations of the modified Dijkstra's shortest path algorithm to further improve the manufacturing process in order to minimize toxic waste.

Figure 6:
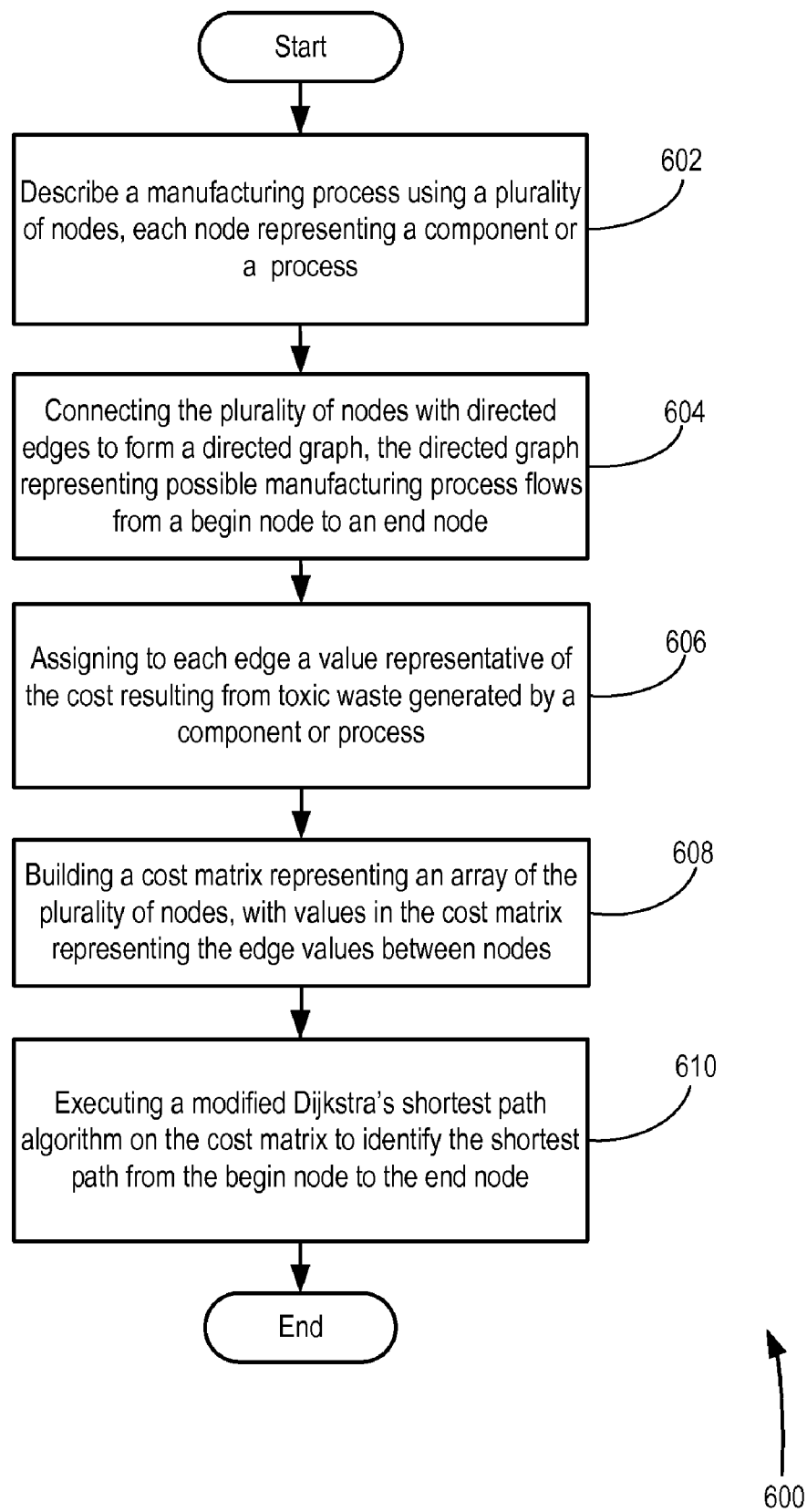
FIG. 6 shows a schematic flowchart of a method in accordance with an embodiment.

Now referring to FIG. 6, shown is an illustrative method 600 in accordance with an embodiment. As shown, method 600 begins at block 602, and describes a manufacturing process using a plurality of nodes, each node representing a component or a process.

Method 600 may then proceed to block 604, where method 600 may connect the plurality of nodes with directed edges to form a directed graph, the directed graph representing possible manufacturing process flows from a begin node to an end node.

Method 600 may then proceed to block 606, where method 600 may assign to each edge a value representative of the cost resulting from toxic waste generated by a component or process.

Method 600 then proceeds to block 608, where method 600 builds a cost matrix representing an array of the plurality of nodes, with values in the cost matrix representing the edge values between nodes.

Method 600 may then proceed to block 610, where method 600 may execute a modified Dijkstra's shortest path algorithm on the cost matrix to identify the shortest path from the begin node to the end node. This shortest path is the solution to minimizing toxic waste during the manufacturing process. Method 600 then ends.

While various illustrative embodiments of the invention have been described above, it will be appreciated by those skilled in the art that variations and modifications may be made. Thus, the scope of the invention is defined by the following claims.

What is claimed is:

1. A method of optimizing a manufacturing process so as to reduce toxic waste in such manufacturing process, comprising:

describing the manufacturing process using a plurality of nodes, each node representing a component or a process;

connecting the plurality of nodes with directed edges to form a directed graph, the directed graph representing possible manufacturing process flows from a begin node to an end node;

assigning to each edge a value representative of a cost resulting from toxic waste generated by a component or process; and determining, using a data processing system including at least one central processing unit, a shortest path from the begin node to the end node in the directed graph to identify a manufacturing process flow having a minimum cost, the determining comprising: building a cost matrix representing an array of the plurality of nodes; and executing a shortest path algorithm on the cost matrix to determine the shortest path from the begin node to the end node in the directed graph;

wherein values in the cost matrix represent the edge values between nodes, wherein the shortest path algorithm comprises a modified Dijkstra's shortest path algorithm, and wherein the shortest path algorithm is run from the end node instead of the begin node, to determine the shortest path from the begin node to the end node in the directed graph.

2. The method of claim 1, further comprising identifying the nodes in the shortest path, and presenting an ordered combination of any components or processes in the shortest path as a solution for minimizing toxic waste in the manufacturing process.

3. The method of claim 1, further comprising modifying the directed graph to incorporate new information by adding or deleting nodes or edges, and by adding or modifying edge values.

4. The method of claim 3, further comprising providing a graphical user interface to allow a user to modify the directed graph by adding or deleting node objects or edge objects, and by adding or modifying edge values associated with the edge objects.

5. The method of claim 4, further comprising converting the directed graph in the graphical user interface into a new cost matrix.

6. The method of claim 5, further comprising re-executing the modified Dijkstra's shortest path algorithm on the new cost matrix to identify the shortest path from the begin node to the end node.

7. A system for optimizing a manufacturing process so as to reduce toxic waste in a manufacturing process, comprising:
    a component for describing the manufacturing process using a plurality of nodes, each node representing a component or a process;
    a component for connecting the plurality of nodes with directed edges to form a directed graph, the directed graph representing possible manufacturing process flows from a begin node to an end node;
    a component for assigning to each edge a value representative of a cost resulting from toxic waste generated by a component or process; and
    a component for determining a shortest path from the begin node to the end node in the directed graph to identify a manufacturing process flow having a minimum cost, the determining comprising: building a cost matrix representing an array of the plurality of nodes; and executing a shortest path algorithm on the cost matrix to determine the shortest path from the begin node to the end node in the directed graph;
    wherein values in the cost matrix represent the edge values between nodes, wherein the shortest path algorithm comprises a modified Diikstra's shortest path algorithm, and wherein the shortest path algorithm is run from the end node instead of the begin node.

8. The system of claim 7, further comprising a component for identifying the nodes in the shortest path, and presenting an ordered combination of any components or processes in the shortest path as the solution for minimizing toxic waste in the manufacturing process.

9. The system of claim 7, further comprising a component for modifying the directed graph to incorporate new information by adding or deleting nodes or edges, and by adding or modifying edge values.

10. The system of claim 9, further comprising a component for providing a graphical user interface to allow a user to modify the directed graph by adding or deleting node objects or edge objects, and by adding or modifying edge values associated with the edge objects.

11. The system of claim 10, further comprising a component for converting the directed graph in the graphical user interface into a new cost matrix.

12. The system of claim 11, further comprising a component for re-executing the modified Dijkstra's shortest path algorithm on the new cost matrix to identify the shortest path from the begin node to the end node.

13. A data processor readable medium storing data processor code that when loaded onto and executed by a data processing device adapts the device to execute a method of optimizing a manufacturing process so as to reduce toxic waste in said manufacturing process, the data processor readable medium comprising:
    code for describing the manufacturing process using a plurality of nodes, each node representing a component or a process;
    code for connecting the plurality of nodes with directed edges to form a directed graph, the directed graph representing possible manufacturing process flows from a begin node to an end node;
    code for assigning to each edge a value representative of a cost resulting from toxic waste generated by a component or process; and
    code for determining a shortest path from the begin node to the end node in the directed graph to identify a manufacturing process flow having a minimum cost, the determining comprising: building a cost matrix representing an array of the plurality of nodes; and executing a shortest path algorithm on the cost matrix to determine the shortest path from the begin node to the end node in the directed graph;
    wherein values in the cost matrix represent the edge values between nodes, wherein the shortest path algorithm comprises a modified Diikstra's shortest path algorithm on the cost matrix, and wherein the shortest path algorithm is run from the end node instead of the begin node.

14. The data processor readable medium of claim 13, further comprising code for identifying the nodes in the shortest path, and presenting an ordered combination of any components or processes in the shortest path as the solution for minimizing toxic waste in the manufacturing process.

15. The data processor readable medium of claim 13, further comprising code for modifying the directed graph to incorporate new information by adding or deleting nodes or edges, and by adding or modifying edge values.

16. The data processor readable medium of claim 15, further comprising code for providing a graphical user interface to allow a user to modify the directed graph by adding or deleting node objects or edge objects, and by adding or modifying edge values associated with the edge objects.

17. The data processor readable medium of claim 16, further comprising code for converting the directed graph in the graphical user interface into a new cost matrix.

18. The data processor readable medium of claim 17, further comprising code for re-executing the modified Dijkstra's shortest path algorithm on the new cost matrix to identify the shortest path from the begin node to the end node.

* * * * *